Patented Feb. 6, 1951

2,540,800

UNITED STATES PATENT OFFICE 2,540,800

ANTIRUST AGENT

Hastings S. Trigg, West Hempstead, N. Y., and Henry D. Norris, Woodbury, and Ralph V. White, Pitman, N. J., assignors to Socony-Vacuum Oil Company, Incorporated, a corporation of New York No Drawing. Original application February 8, 1947, Serial No. 727,304. Divided and this application November 24, 1948, Serial No. 61,916

12 Claims. (Cl. 260—313)

This invention relates to certain new compositions of matter formed by the interaction of alkenyl succinic acid anhydrides and primary amines.

Various alkenyl succinic acids and their anhydrides, and many primary amines are known, and some of these have been added to lubricating oils for various purposes. Insofar as is known, however, no reaction products of alkenyl succinic acid anhydrides with primary amines have been prepared.

According to the present invention, it has been discovered that alkenyl succinic acid anhydrides may be reacted with primary amines to produce reaction products of an entirely new type. Certain of these reaction products when added to lubricating oil, effectively inhibit the formation of rust, even in the presence of sea water. The effectiveness of these new reaction products in inhibiting rust formation is in distinct contrast to the properties of the reactants from which the products are made, which exhibit little or no tendency to inhibit rust formation under the same conditions.

The new reaction products, when added in minor amounts to lubricating oil, not only inhibit rust formation on metals immersed therein or coated thereby, but have no deleterious effect on the lubricating oil in other respects, and probably improve the lubricating oil in other characteristics as well as in its rust inhibiting characteristics.

REACTANTS

The new reaction products may be prepared from any alkenyl succinic acid anhydride, or any mixture thereof, and with any primary amine or mixture of primary amines. Either the anhydride or the amine may be used in a chemically pure or commercial state, and either may be a single compound or a mixture of a number of compounds. The amine may be an alkyl, aryl, cycloalkyl or heterocyclic amine, or may contain any combination of organic radicals. Normal primary alkyl amines are preferred.

Alkenyl succinic acids may, less desirably, be used in place of their anhydrides, although this necessitates much more careful removal of water and often produces considerable amounts of undesirable by-products.

The preferred proportions in which the reactants are reacted is two molecular weights of the alkenyl succinic acid anhydride to one molecular weight of the primary amine. Products having as little as 1.25 molecular proportions of alkenyl succinic acid anhydride to 1 molecular proportion of primary amine have been found effective in inihibiting rust when incorporated in lubricating oil, and products having more than 2 molecular proportions of alkenyl succinic acid anhydride to 1 molecular proportion of primary amine are also effective for this purpose, although it does not appear that 1 molecule of primary amine can react with more than 2 molecules of alkenyl succinic acid anhydride and the effect of using more than 2 molecular proportions of alkenyl succinic acid anhydride is, therefore, apparently merely to dilute the final product with the excess of alkenyl succinic acid anhydride.

Products effective as rust inhibitors in lubricating oil can be prepared from primary amines having as few as 4 carbon atoms in the alkyl chain, provided the alkenyyl succinic acid anhydride contains about 10 to 12 carbon atoms or more in the alkenyl radical. On the other hand, reaction products effective as rust inhibitors in lubricating oil can be prepared from alkenyl succinic acid anhydrides containing as few as 6 to 8 carbon atoms in the alkenyl radical if the primary amine contains around 12 carbon atoms in the alkyl chain. From this it appears that the total number of carbon atoms contained in the reactants is a critical factor when the reaction product is to be used as a rust inhibitor in lubricating oil. The indications are that the total number of carbon atoms in 2 mols of the anhydride and 1 mol of the amine should be no less than about 28 and preferably no less than 32 to give a product that will substantially inhibit rust when incorporated in lubricating oil in normal concentrations. A smaller total number of carbon atoms will give products which have some anti-rust activity, if the products are used in higher concentrations. The preferred reactants for producing rust inihibiting agents for use in oil are alkenyl succinic acid anhydrides containing about 10 to 12 carbon atoms in each alkenyl chain and primary amines containing about 10 to 14 carbon atoms per molecule.

REACTION CONDITIONS

The reaction of the anhydride with the primary amine is quite easy of accomplishment and may be carried out in any number of ways, either in an open beaker or in a closed flask. A temperature of 75° C. is apparently necessary to cause the reaction to take place and temperatures in excess of about 140° C. are apparently undesirable in that they may cause undesirable side reactions or deterioration of the reactants or the reaction product. It is definitely preferable to use a temperature of between about 105° C. and about 115° C.

The time of reaction does not appear to be especially critical, the neutralization number of the final product indicating that the reaction is substantially complete in around 3½ hours at the preferred temperature. Time and temperature are, however, interdependent, and a longer period of time is required at lower temperatures.

Further details of this invention and further advantages may be understood from the following detailed examples and results of tests.

In the examples, commercial alkenyl succinic acid anhydrides have been used. Instead of being a single, pure, chemical compound, these commercial anhydrides are mixtures of alkenyl succinic acid anhydrides in which the alkenyl side chains range generally between certain limits. Three different products were used in the following examples, one of which was a mixture of alkenyl succinic acid anhydrides in which the alkenyl radicals averaged 6 to 8 carbon atoms in length, a second was a similar mixture of anhydrides in which the alkenyl radicals averaged 8 to 10 carbon atoms in length, and the third, a similar mixture of anhydrides in which the alkenyl radicals ranged from 10 to 12 carbon atoms in length. The general structure for these compounds may be considered to be:

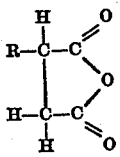

where R is a mixture of alkenyl groups having an average of from 6 to 8, 8 to 10, or 10 to 12 carbon atoms. The mixtures used in the following examples were those manufactured and sold by the Solvay Process Company of New York, New York.

The primary amines used in the following examples were likewise of a commercial quality, rather than chemically pure, except where otherwise noted. These commercial-quality primary amines are 97% pure and contain predominantly the number of carbon atoms indicated. The commercial amines used in the following examples are manufactured and sold by Armour & Company of Chicago, Illinois under the tradenames "Armeen CD," "Armeen SD," "Armeen 8D," "Armeen 10D," "Armeen 12D," "Armeen 14D," "Armeen 16D," and "Armeen 18D." "Armeen CD" is a mixture of primary amines prepared from coconut oil, "Armeen SD" is a mixture of primary amines prepared from soybean oil, and the other "Armeens" are mixtures of primary amines containing predominantly the number of carbon atoms specified in the code number. Theoretical neutralization numbers are based on the assumption that the amine can neutralize half of the available acidity in the anhydride.

EXAMPLE I

A commercial C₁₀₋₁₂ alkenyl succinic acid anhydride of the type described above, and "Armeen CD" were reacted in a 2:1 molar ratio by placing in a beaker 14.5 g. of the anhydride and 5.0 g. of the amine. The reactants were stirred together, the heat of reaction raising the temperature to about 80° C. The mixture was then placed in an oven at 105–110° C. for about 1 hour. The reaction product was a fairly viscous, amber colored liquid with a neutralization number (milligrams of KOH equivalent to 1 g. of products) of 191. The theoretical neutralization number of this product was calculated to be 140.

EXAMPLE II

A commercial C₁₀₋₁₂ alkenyl succinic acid anhydride was reacted with "Armeen 10D" in a closed flask in the absence of air by placing 60 g. of the anhydride in a 4-necked, 200 cc. flask flushed with nitrogen gas, and heating the anhydride to 109° C., still in an atmosphere of nitrogen. 15.9 g. (0.1 g. excess for drainage) of "Armeen 10D" was then placed in a dropping funnel in which an atmosphere of nitrogen gas was maintained during the subsequent operation, and this amine was added dropwise to the anhydride at a rate sufficient to raise the temperature in the flask to 113° C. and to maintain it at that temperature without the application of external heat. After the addition of the amine was completed, the flask was heated and stirred at 115° C. for 3 hours. The product was a dark, amber colored viscous liquid and there was no deposit on the walls of the flask. The neutralization number of the product was 161.9, whereas theoretically it should have been 152.9.

A number of other products were prepared by the above methods by using different amines and different anhydrides. In the tables which follow, the manner of preparation will be designated by a numeral I or II, these numerals serving to designate that the product was prepared in accordance with Example I or in accordance with Example II, respectively. In general, the procedure of Example II has been found preferable. As an indication of the length of time necessary to accomplish the desired reaction two mols of a C₈₋₁₀ commercial alkenyl succinic acid anhydride and one mol of "Armeen CD" were heated at 115° C. in a flask and portions removed from time to time and tested for neutralization number to determine the progress of the reaction. The change in neutralization number is shown in the following table:

TABLE I

| Time (Hours) | Neutralization No. |
|---|---|
| 0 | 220 |
| ½ | 215 |
| 1 | 192 |
| 1½ | 184 |
| 2½ | 168 |
| 3½ | 160 |

The theoretical neutralization number for this product is 158. The indication therefore is that the reaction was substantially complete in a period of about 3½ hours. The effectiveness of the various products prepared in accordance with this invention, as rust inhibitors, was determined in accordance with ASTM Test D665–44T for determining "Rust Preventing Characteristics of Steam Turbine Oils in Presence of Water." In accordance with this test, both synthetic sea water and distilled water are used. The synthetic sea water contained 25 g. of sodium chloride, 11 g. of magnesium chloride (MgCl₂.6H₂O), 4 g. of sodium sulphate and 1.2 g. of calcium chloride per liter. In the test a cylindrical, polished steel specimen is suspended and soaked in 300 cc. of the oil under test at 140° F. for 30 minutes. 30 cc. of synthetic sea water (or 30 cc. of distilled water) are added and the mixture is stirred at 1000 R. P. M. After 48 hours the steel specimen is removed and examined for evidence of rust. The oil passes the test when there is no evidence of rust on that part of the specimen which hangs below the oil level.

In the following tests, various of the reaction products of this invention were blended with a base oil commonly used for rust inhibiting tests. This oil was a blend of a solvent refined Mid-Continent residual stock with a solvent refined Mid-Continent (Rodessa) distillate stock which gives an oil having a specific gravity of 0.872, a flashpoint of 445° F. and a Saybolt Universal viscosity of 407.7 seconds at 100° F. Such an oil is suitable for use in steam turbines.

To determine whether or not the addition of the reaction products of this invention to oils cause the formation of undesirable emulsions, emulsion tests were also conducted on the oil-reaction product mixtures in accordance with the emulsion test for lubricating oils described in the Federal Stock Catalog, Sec. IV, Part 5, Federal Specifications VV-L-791b, February 19, 1942. In accordance with the test method 320.13, 40 cc. of oil and 40 cc. of a standard emulsant are placed in a 100 cc. cylinder and stirred with a paddle at 1500 R. P. M. for 5 minutes at the prescribed temperature. Separation of the emulsion is observed while the cylinder is kept at the prescribed temperature for the specified time. The figures in the tables show the number of minutes during which an emulsion layer persists between the oil and the emulsion. An oil is usually considered not to be emulsive if there is no continuous emulsion layer after 30 minutes. See Tables II, III and IV, pages 11, 12 and 13.

Similar tests were conducted on the alkenyl succinic acid anhydrides used in preparing the reaction products and hydrolyzed alkenyl succinic acid anhydrides. These tests indicated that they are not satisfactory rust inhibitors in themselves. Results of these tests are shown in Table V, page 14.

Further tests were made of the reaction products of $C_{10-12}$ alkenyl succinic acid anhydrides and "Armeen 10D," reacted in various molar proportions and reacted at various temperatures to indicate the effect of proportions and temperature on the effectiveness of the products as rust inhibitors. The results of these tests are shown in Table VI, page 16.

The results of the test on page 16 indicate that it is necessary to use temperatures in excess of 75° C. to produce the preferred type of products and that it is desirable to use a molar ratio of at least 1.25 to 1 of anhydride to amine in order to produce the preferred type of products. The products prepared at 75° C. and the products prepared using a 1 to 1 molar ratio did show some rust inhibiting characteristics. However, the data obtained indicate that it is distinctly preferable to use a molar ratio of at least 1.25 to 1 and a temperature in excess of 75° C. In order to obtain the most satisfactory type of product, it is far preferable to use a temperature of 105° C. or above in the preparation of the reaction products.

Tests of oils containing other additives in addition to the reaction products of this invention have indicated that no incompatibility exists and that practically any other additive which it is desired to add may be added without affecting the beneficial results obtained by the addition of the reaction products of this invention and without impairing the effectiveness of the other additives.

Table II

Products of 2 moles $C_{10-12}$ anhydride and 1 mole primary amine

| Amine Used | Method of Preparation | Neutralization No. | Concentration in Blends, Per Cent | A. S. T. M. Rust Test ||||| Govt. Emulsion Break, Min. ||
|---|---|---|---|---|---|---|---|---|---|
| | | | | Synthetic Seawater || Distilled Water || H₂O | 1% NaCl |
| | | | | Result | Remarks | Result | Remarks | | |
| Armeen CD | I | 191.6 | 0.10 | Pass | Gray coat | | | | |
| | | | 0.05 | do | do | | | | |
| | | | 0.02 | do | Light gray coat | | | 17/16 | 17/16 |
| | | | 0.01 | Fail | 10–15 spots | | | | |
| | | | 0.005 | | | Pass | Light gray coat | | |
| Do | I | 191.4 | 0.05 | Pass | Gray coat | | | | |
| | | | 0.003 | | | Pass | Perfect | | |
| Do | I | 168.0 | 0.05 | Pass | Gray coat | | | | |
| n-Butylamine | I | 167.4 | 1.00 | do | Heavy gray coat | | | | |
| n-Octylamine | I | 183.3 | 0.05 | do | do | | | 12 | 13 |
| Armeen 8D | I | 188.2 | 0.05 | do | Gray coat | | | 15 | 18 |
| | | | 0.02 | do | do | | | 18 | 15 |
| Armeen 10D | I | 188.8 | 0.01 | Fail | 2 large patches | | | | |
| Do | II | 161.9 | 0.05 | Pass | Gray coat | | | 16 | 16 |
| | | | 0.05 | do | do | | | 14 | 10 |
| | | | 0.02 | do | do | | | | |
| | | | 0.01 | Fail | Severe rust | | | | |
| | | | 0.003 | | | Pass | Perfect | | |
| | | | 0.001 | | | Fail | Severe rust | | |
| Armeen 12D | I | 176.1 | 0.05 | Pass | Gray coat | | | 16 | 16 |
| Armeen 14D | I | 165.3 | 0.05 | do | do | | | 15 | 17 |
| Armeen 16D | I | 169.9 | 0.05 | do | do | | | 15 | 17 |
| Armeen 18D | I | 157.1 | 2.0 | do | Heavy coat | | | | |
| | | | 1.0 | do | do | | | | |
| | | | 0.05 | do | Gray coat | | | 17 | 16 |
| | | | 0.02 | do | do | | | | |
| Armeen SD | I | 175.1 | 0.05 | do | do | | | 14 | 15 |
| Cyclohexylamine | I | 191.3 | 0.05 | do | do | | | 12 | 12 |
| Benzylamine | I | 175.5 | 0.05 | do | Yellow coat | | | 17 | 14 |
| Aniline | I | 180.8 | 0.05 | do | Gray coat | | | 16 | 14 |

TABLE III

*Products of 2 moles of C8-10 anhydride and 1 mole primary amine*

| Amine Used | Method of Preparation | Neutralization No. | Concentration in Blends, Percent | A. S. T. M. Rust Test | | | | Govt. Emulsion Break, Min. | |
|---|---|---|---|---|---|---|---|---|---|
| | | | | Synthetic Seawater | | Distilled Water | | | |
| | | | | Result | Remarks | Result | Remarks | $H_2O$ | 1% NaCl |
| Armeen CD | I (less than ½ hr.) | 215.5 | 0.05 | Pass | Gray coat | | | 16 | 17 |
| Do | I (1 hr.) | 192.2 | 0.05 | do | do | | | | |
| Do | I (3½ hrs.) | 159.4 | 0.05 | do | do | | | | |
| n-Butylamine | I | 218.5 | 0.2 | Fail | Gum stain | Pass | Lt. coat | 10 | 11 |
| | | | 0.05 | do | Mod.-severe | | | | |
| Armeen 8D | I | 220.6 | 1.0 | Pass | Brown coat | | | 12 | 10 |
| | | | 0.05 | do | Gray coat | | | 12 | 12 |
| Armeen 10D | I | 216.2 | 0.05 | do | do | | | | |
| Do | II | 211.5 | 0.05 | Fail | 2 patches | | | 12 | 16 |
| Armeen 12D | I | 183.5 | 0.05 | Pass | Gray coat | | | 14 | 14 |
| Armeen 14D | I | 195.3 | 0.05 | do | do | | | 15 | 15 |
| Armeen 16D | I | 201.3 | 0.05 | do | do | | | | |
| Armeen 18D | I | 180.9 | 1.0 | do | Heavy brown coat | | | 16 | 16 |
| | | | 0.05 | do | Light coat | | | | |
| | | | 0.02 | Fail | 25 spots | | | | |
| | | | 0.01 | do | do | | | 14 | 14 |
| Armeen 8D | I | 164.9 | 0.05 | Pass | Light coat | | | | |
| Cyclohexylamine | I | 225.8 | 0.2 | do | Brown coat | | | | |
| | | | 0.1 | Pass (?) | 3 p. p. spots | Pass | Lt. coat | 10 | 12 |
| | | | 0.05 | Fail | 14 spots | | | | |
| Benzylamine | I | 207.1 | 0.2 | Pass | Heavy coat | Pass | Lt. coat | 5 | 6 |
| | | | 0.05 | Fail | Mod. rust | | | | |
| Aniline | I | 210.9 | 0.2 | Pass | Heavy coat | | | | |
| | | | 0.1 | Fail | 1 patch | Pass | Lt. coat | 8 | 8 |
| | | | 0.05 | do | Light rust | | | | |

TABLE IV

*Products of 2 moles C6-8 anhydride and 1 mole primary amine*

| Amine Used | Method of Preparation | Neutralization No. | Concentration in Blends, Per Cent | A. S. T. M. Rust Test | | | | Govt. Emulsion Break, Min. | |
|---|---|---|---|---|---|---|---|---|---|
| | | | | Synthetic Seawater | | Distilled Water | | | |
| | | | | Result | Remarks | Result | Remarks | $H_2O$ | 1% NaCl |
| Armeen 8D | I | 221.8 | 0.05 | Fail | Severe | Fail | Mod. rust | 5 | 5 |
| | | | 0.10 | | | do | Severe | | |
| Armeen 10D | I | 199.3 | 0.05 | Fail | Mod. rust | do | 200 spots | 4 | 5 |
| Armeen 12D | I | 206.5 | 0.05 | do | Heavy rust | | | 6 | 6 |
| Do | II | 204.0 | 0.05 | do | Lt.-Mod. | Pass | Perfect | 8 | 6 |
| Armeen 18D | II | 189.3 | 0.05 | do | Severe, upper ¾ | Fail | 3 spots | | |
| | | | 0.05 | | | Pass | | | |

TABLE V

*Alkenyl succinic acid anhydride*

| Material | Neutralization No. | Concentration in Blend, Per Cent | A. S. T. M. Rust Test | | | |
|---|---|---|---|---|---|---|
| | | | Synthetic Seawater | | Distilled Water | |
| | | | Result | Remarks | Result | Remarks |
| C8-10 | 460.5 | 0.05 | Fail | Severe | Fail | Severe. |
| | | 0.02 | do | do | do | Do. |
| Hydrolyzed C8-10 | 438.7 | 0.05 | do | do | Pass | Gray coat. |
| | | 0.02 | do | do | Fail | Mod. rust. |
| C10-12 | 384.2 | 0.05 | do | do | do | Severe. |
| | | 0.02 | do | do | do | |
| Hydrolyzed C10-12 | 349.9 | 0.04 | do | Lt. rust | Pass | Perfect. |
| | | 0.02 | do | | do | Gray coat. |
| | | 0.01 | | | | |

TABLE VI

Reaction products of $C_{10-12}$ anhydrides and Armeen 10D in various molar proportions—tested by A. S. T. M. rust test in synthetic seawater

| Moles of Anhydride | Moles of Amine | Concentration in Blend, Percent | Products Prepared at 115° C. | | | Products Prepared at 75° C. | | |
|---|---|---|---|---|---|---|---|---|
| | | | Neutralization No. | A. S. T. M. Rust Test | | Neutralization No. | A. S. T. M. Rust Test | |
| | | | | Result | Remarks | | Result | Remarks |
| 2 | 1 | 0.05 | 161.9 | Pass | Heavy coat | 212.4 | Fail | 50 spots. |
| | | 0.03 | | do | Light coat | | | |
| | | 0.02 | | do | do | | | |
| | | 0.01 | | Fail | Severe | | | |
| 1.75 | 1 | 0.05 | 157.9 | Pass | Heavy coat | 202.5 | do | Do. |
| | | 0.04 | | do | Perfect | | | |
| | | 0.03 | | do | do | | | |
| | | 0.02 | | Fail | 20 spots | | | |
| 1.5 | 1 | 0.05 | 135.0 | Pass | Light gray coat | 183.8 | do | 75 spots. |
| | | 0.04 | | do | Perfect | | | |
| | | 0.03 | | do | do | | | |
| | | 0.02 | | Fail | 1 patch and 25 spots. | | | |
| 1.25 | 1 | 0.05 | 89.7 | Pass | | 163.4 | do | Do. |
| | | 0.03 | | do | | | | |
| | | 0.02 | | Fail | 7 large patches | | | |
| 1 | 1 | 0.10 | 45.7 | do | Med. rust | 128.7 | do | Mod. rust. |
| | | 0.05 | | do | do | | do | Mod. Heavy |

Tests conducted by a modification of the proposed A. S. T. M. method of testing the oxidation characteristics of steam turbine oils (which method is now designated as D943–47T), according to which modification the oxidation-inhibited oil is subjected to a temperature of 203° F. (95° C.) in the presence of water, oxygen (3 liters per hour), and an iron-copper coil suspended in the oil above the water layer, for a period of 1000 hours, also indicated that the reaction products of this invention are highly effective as rust preventatives.

The results of Brown-Boveri turbine oil tests have also been very satisfactory and show that the reaction products of this invention impart no sludging properties or other undesirable characteristics to the oxidation-inhibited oil blends in which they are incorporated.

Atmospheric corrosion tests further indicate that oil compositions including a minor percentage of the reaction products of this invention are highly effective in preventing atmospheric corrosion.

This application is a division of application Serial No. 727,304 filed February 8, 1947, now U. S. Patent 2,490,744.

What is claimed is:

1. As a new composition of matter, the reaction product obtained by reacting an acidic reactant selected from the group consisting of an alkenyl succinic acid anhydride, an alkenyl succinic acid, and mixtures of alkenyl succinic acid anhydrides and of alkenyl succinic acids with a primary amine reactant selected from the group consisting of a primary amine and a mixture of primary amines, in a molar proportion of at least 1.25:1, respectively, and at a temperature varying between about 75° C. and about 140° C.

2. As a new composition of matter, the reaction product obtained by reacting an alkenyl succinic acid anhydride with a primary amine, in a molar proportion of at least 1.25:1, respectively, and at a temperature varying between about 75° C. and about 140° C.; the sum of twice the number of carbon atoms per molecule of said alkenyl succinic acid anhydride and of the number of carbon atoms per molecule of said primary amine being at least 28.

3. As a new composition of matter, the reaction product obtained by reacting an alkenyl succinic acid anhydride with a primary, aliphatic amine, in a molar proportion of at least 1.25:1, respectively, and at a temperature varying between about 75° C. and about 140° C.; the sum of twice the number of carbon atoms per molecule of said alkenyl succinic acid anhydride and of the number of carbon atoms per molecule of said primary amine being at least 28.

4. As a new composition of matter, the reaction product obtained by reacting an alkenyl succinic acid anhydride, having between about six and about eight carbon atoms per alkenyl radical, with a primary amine, having at least about eight carbon atoms per molecule, in a molar proportion of at least 1.25:1, respectively, and at a temperature varying between about 75° C. and about 140° C.

5. As a new composition of matter, the reaction product obtained by reacting an alkenyl succinic acid anhydride, having between about eight and about ten carbon atoms per alkenyl radical, with a primary amine, having at least about four carbon atoms per molecule, in a molar proportion of at least 1.25:1, respectively, and at a temperature varying between about 75° C. and about 140° C.

6. As a new composition of matter, the reaction product obtained by reacting an alkenyl succinic acid anhydride, having between about ten and about twelve carbon atoms per alkenyl radical, with a primary amine, having at least about four carbon atoms per molecule, in a molar proportion of at least 1.25:1, and at a temperature varying between about 75° C. and about 140° C.

7. As a new composition of matter, the reaction product obtained by reacting an alkenyl succinic acid anhydride, having between about six and about eight carbon atoms per alkenyl radical, with dodecylamine, in a molar proportion of about 2:1, respectively, and at a temperature varying between about 105° C. and about 115° C.

8. As a new composition of matter, the reaction product obtained by reacting an alkenyl succinic acid anhydride, having between about eight and about ten carbon atoms per alkenyl radical, with aniline, in a molar proportion of about 2:1, respectively, and at a temperature varying between about 105° C. and about 115° C.

9. As a new composition of matter, the reaction product obtained by reacting an alkenyl succinic acid anhydride, having between about ten and about twelve carbon atoms per alkenyl radical, with a primary, aliphatic amine, having between about ten and about fourteen carbon atoms per molecule, in a molar proportion of about 2:1, respectively, and at a temperature varying between about 105° C. and about 115° C.

10. As a new composition of matter, the reaction product obtained by reacting an alkenyl succinic acid anhydride, having between about ten and about twelve carbon atoms per alkenyl radical, with a primary, aliphatic amine prepared from coconut oil, in a molar proportion of about 2:1, respectively, and at a temperature varying between about 105° C. and about 115° C.

11. As a new composition of matter, the reaction product obtained by reacting an alkenyl succinic acid anhydride having between about ten and about twelve carbon atoms per alkenyl radical, with cyclohexylamine, in a molar proportion of about 2:1, respectively, and at a temperature varying between about 105° C. and about 110° C.

12. As a new composition of matter, the reaction product obtained by reacting an alkenyl succinic acid anhydride, having between about ten and about twelve carbon atoms per alkenyl radical, with butylamine, in a molar proportion of about 2:1, respectively, and at a temperature varying between about 105° C. and about 115° C.

HASTINGS S. TRIGG.
HENRY D. NORRIS.
RALPH V. WHITE.

REFERENCES CITED

The following references are of record in the file of this patent:

UNITED STATES PATENTS

| Number | Name | Date |
| --- | --- | --- |
| 2,182,178 | Pinkernelle | Dec. 5, 1939 |